United States Patent
Huang et al.

(10) Patent No.: US 10,659,719 B2
(45) Date of Patent: May 19, 2020

(54) MOUNTING STRUCTURE

(71) Applicant: HONGFUJIN PRECISION ELECTRONICS (CHONGQING) CO., LTD., Chongqing (CN)

(72) Inventors: Chien-Cheng Huang, New Taipei (TW); Chin-Chi Lin, New Taipei (TW)

(73) Assignee: HONGFUJIN PRECISION ELECTRONICS (CHONGQING) CO., LTD., Chongqing (CN)

( * ) Notice: Subject to any disclaimer, the term of this patent is extended or adjusted under 35 U.S.C. 154(b) by 16 days.

(21) Appl. No.: 16/169,958

(22) Filed: Oct. 24, 2018

(65) Prior Publication Data
US 2019/0394422 A1 Dec. 26, 2019

(30) Foreign Application Priority Data

Jun. 20, 2018 (CN) .......................... 2018 1 0640252

(51) Int. Cl.
| | |
|---|---|
| *H04N 5/655* | (2006.01) |
| *F16M 11/04* | (2006.01) |
| *F16M 13/02* | (2006.01) |
| *G06F 1/16* | (2006.01) |
| *F16M 11/22* | (2006.01) |

(52) U.S. Cl.
CPC .......... *H04N 5/655* (2013.01); *F16M 11/041* (2013.01); *F16M 11/22* (2013.01); *F16M 13/02* (2013.01); *F16M 2200/02* (2013.01); *G06F 1/1601* (2013.01)

(58) Field of Classification Search
CPC ...... H04N 5/655; F16M 11/041; F16M 11/22; F16M 14/02; F16M 220/02; F16M 13/02; F16M 2200/02; G06C 1/1601
See application file for complete search history.

(56) References Cited

U.S. PATENT DOCUMENTS

| | | | | |
|---|---|---|---|---|
| 4,655,365 | A * | 4/1987 | Miller | ..................... F16J 13/18 105/377.07 |
| 2002/0182896 | A1* | 12/2002 | Welsh | .................. H05K 7/1409 439/1 |
| 2015/0265073 | A1* | 9/2015 | Tsai | ....................... F16M 13/02 248/475.1 |

* cited by examiner

*Primary Examiner* — Anita M King
(74) *Attorney, Agent, or Firm* — ScienBiziP, P.C.

(57) ABSTRACT

A mounting structure for removably mounting a cover body to an external component of the cover body includes a limiting member, a latching member, and a positioning member. The limiting member is coupled to the cover body. The latching member is coupled to the limiting member and configured to latch with the external component. The positioning member defines a positioning slot and a releasing slot continuous with the positioning slot. The latching member is received in the positioning slot or the releasing slot. The latching member is movably coupled to the positioning member. When the latching member is received within the positioning slot, the latching member is locked by the positioning member and latched with the external component. When the latching member is received within the releasing slot, the latching member is released by the positioning member and released from latching with the external component.

14 Claims, 4 Drawing Sheets

MOUNTING STRUCTURE

FIELD

The subject matter herein generally relates to mounting structures, and more particularly to a mounting structure for mounting an external component.

BACKGROUND

Generally, objects that require mounting, such as display screens, are mounted to a stand or to a wall-mounted bracket. The stand and the wall-mounted bracket generally require screws or additional tools for assembly.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
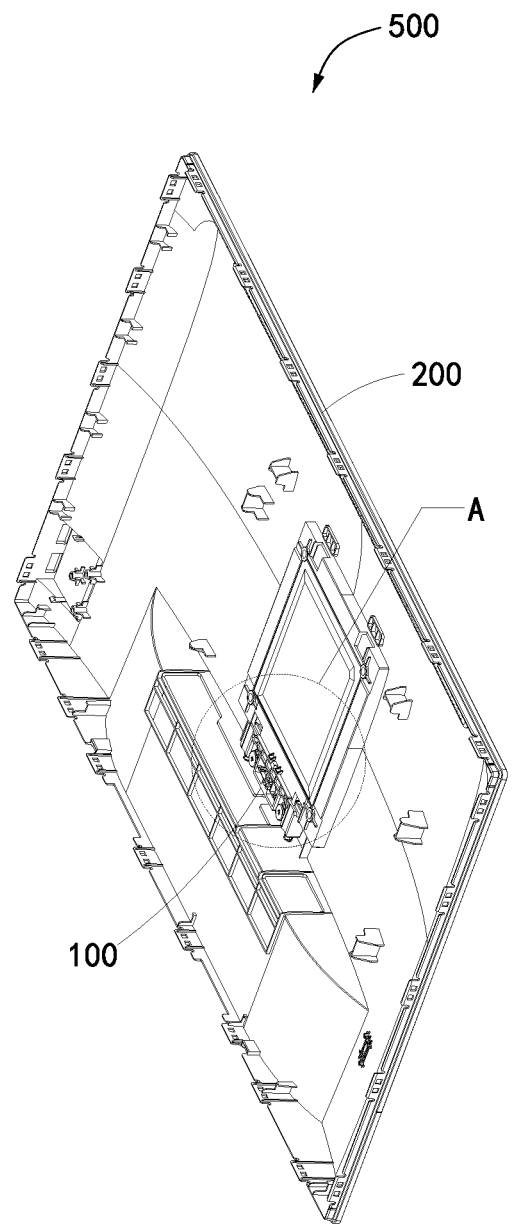
FIG. 1 is an assembled, isometric view of an embodiment of a cover plate including a cover body and a mounting structure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
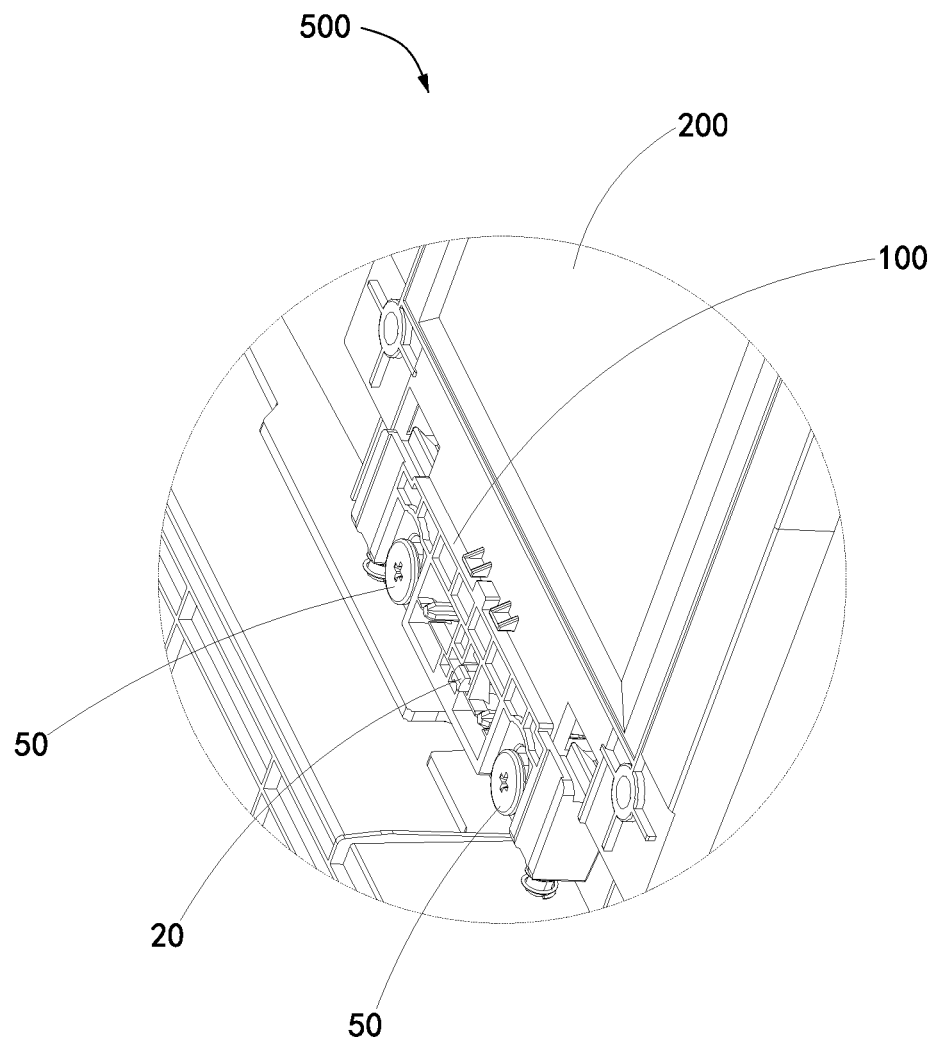
FIG. 2 is a close-up view of circled portion A in FIG. 1.

FIG. 1 and FIG. 2 show an embodiment of a cover plate 500 including a cover body 200 and a mounting structure 100.

The mounting structure 100 is used for removably mounting the cover body 200 to an external component (not shown in figures) of the cover body. For example, in one embodiment, the external component is a display device, and the cover body 200 is a back cover of the display device. The mounting structure 100 is used for removably mounting the cover body 200 to the external component.

Figure 3:
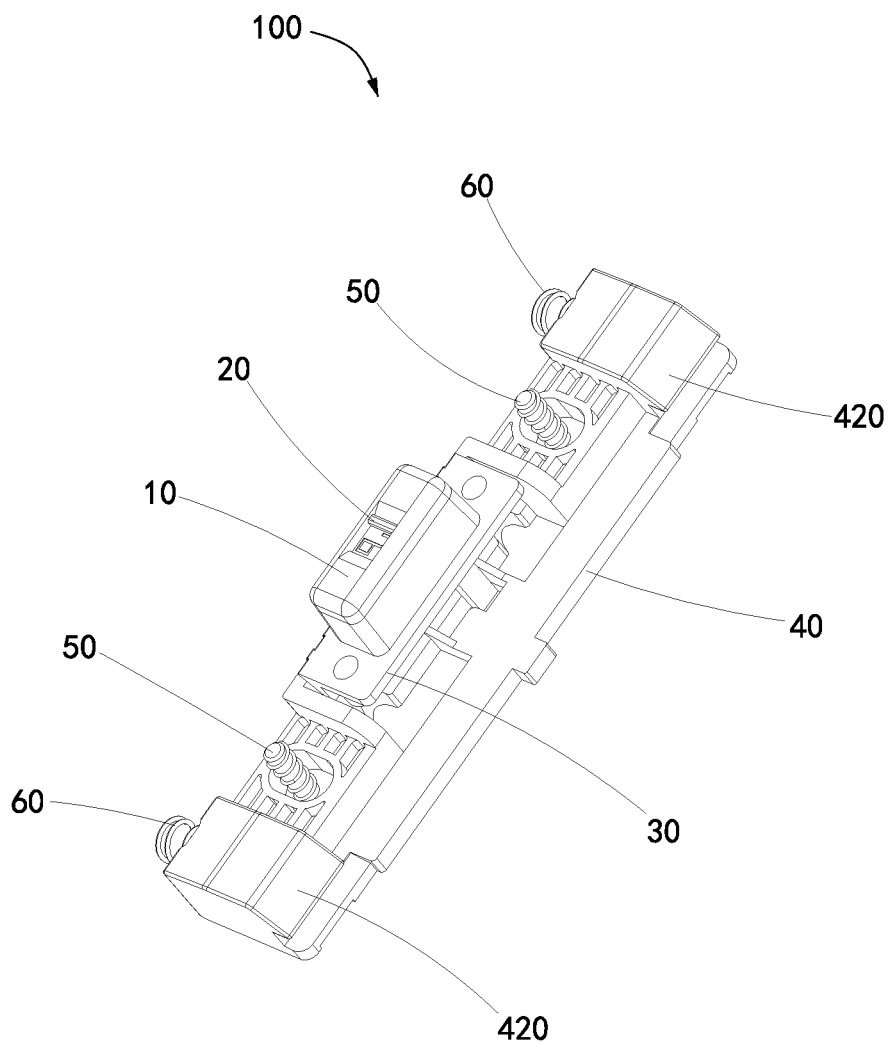
FIG. 3 is an isometric view of the mounting structure in FIG. 1.
Figure 4:
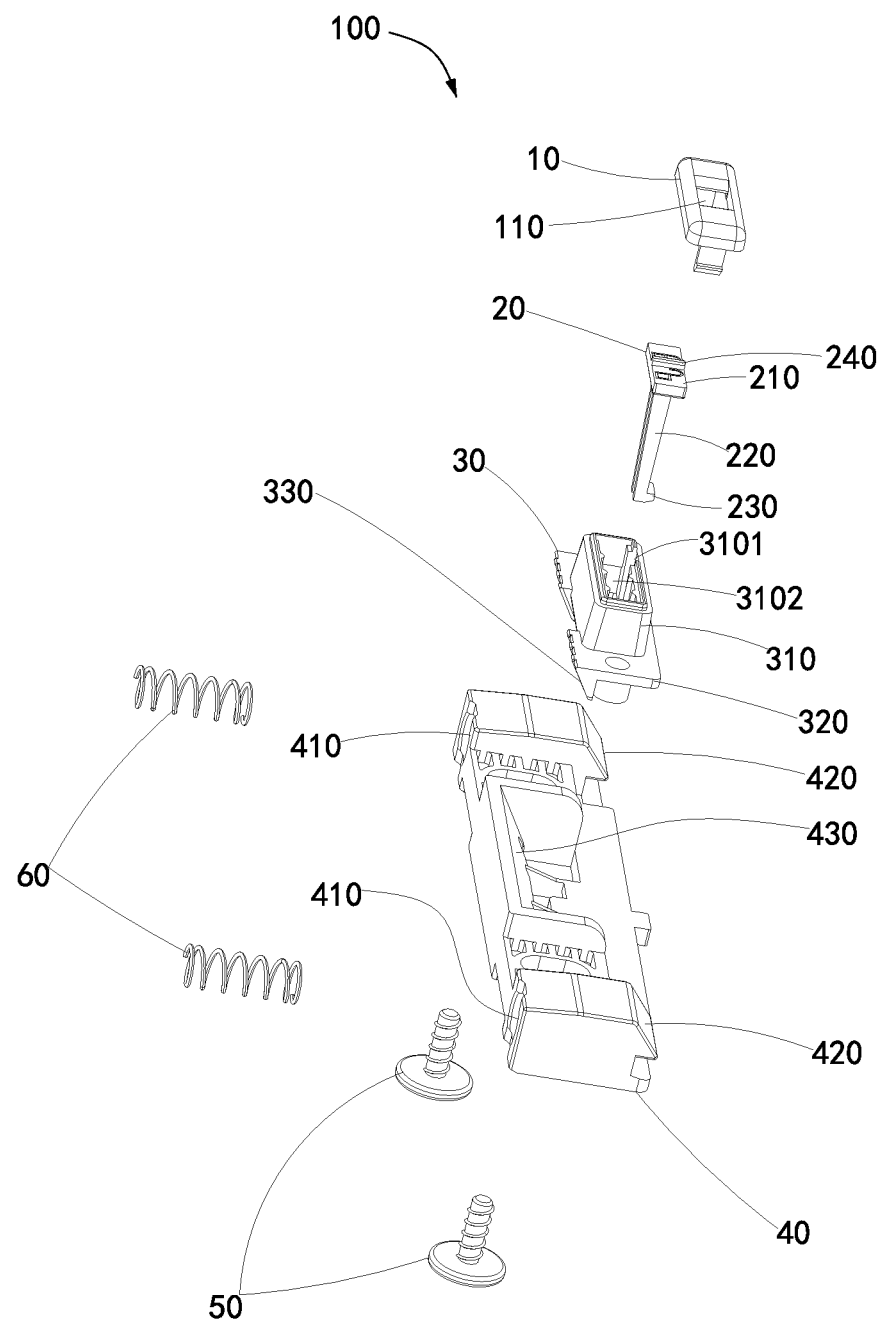
FIG. 4 is an exploded view of the mounting structure in FIG. 3.

FIG. 3 and FIG. 4 show the mounting structure 100 including a latching member 20, a limiting member 40, and a positioning member 30.

The limiting member 40 is coupled to the cover body 200. One end of the latching member 20 is coupled to the limiting member 40, and another end of the latching member 20 is configured to be latched with the external component.

The positioning member 30 defines a positioning slot 3101 and a releasing slot 3102. The releasing slot 3102 is continuous with the positioning slot 3101.

The positioning slot 3101 and the releasing slot 3102 are configured to selectively receive the latching member 20. The latching member 20 is removably coupled to the positioning member 30.

The latching member 20 is configured to be moved to latch with the external component or release the external component.

When the latching member 20 is moved to be received within the positioning slot 3101, the latching member 20 is locked with the positioning member 30 and latched with the external component.

When the latching member 20 is moved to be received within the releasing slot 3102, the latching member 20 is released by the positioning member 30 and is movable relative to the positioning member 30 to be released from latching with the external component.

For example, in one embodiment, the positioning member 30 includes a positioning portion 310. The positioning portion 310 defines the positioning slot 3101 and the releasing slot 3102. The releasing slot 3102 is substantially rectangular. When the latching member 20 is moved to be received within the releasing member 3102, the latching member 20 is released from latching with the external component. The positioning slot 3101 and the releasing slot 3102 are continuous with each other, and the positioning slot 3101 extends along a direction substantially perpendicular to an extending direction of the releasing slot 3102. When the latching member 20 is moved to be received within the positioning slot 3101, the latching member 20 the latching member 20 is moved toward the external component to latch with the external component.

The mounting structure 100 further includes a locking member 10. The locking member 10 is movable between a locking position and a releasing position with the latching member 20.

When the locking member 10 is moved to the locking position, the latching member 20 is locked within the positioning slot 3101. When the locking member 10 is moved to the releasing position, the latching member 20 is released by the locking member 10 and is able to be moved from the positioning slot 3101 to the releasing slot 3102. Thus, the latching member 20 is prevented from moving out of the positioning slot 3101 when latching with the external component.

In one embodiment, the latching member 20 includes an arm portion 220, a movable end 210, and a hook 230. The movable end 210 is coupled to one end of the arm portion 220, and the hook 230 is coupled to another end of the arm portion 220.

The latching member 20 is movably coupled to the positioning member 30 by the movable end 210. The latching member 20 is latched with the external component by the hook 230.

For example, the locking member 10 defines a latching slot 110. The movable end 210 forms a protrusion 240. When the locking member 10 is moved to the locking position, the protrusion 240 abuts an inner wall of the latching slot 110, thereby locking the latching member 20 within the positioning slot 3101. When the locking member 10 is moved to the releasing position, the protrusion 240 does not abut the inner wall of the latching slot 110, thereby releasing the latching member 20 so that the latching member 20 is able to be moved from the positioning slot 3101 to the releasing slot 3102.

In one embodiment, the positioning member 30 includes a pushing portion 320. The pushing portion 320 forms a first inclined surface 330. The limiting member 40 forms a second inclined surface 430. When the positioning member 30 is pressed by an external force toward the limiting member 40, the second inclined surface 430 abuts the first inclined surface 330 to cause the positioning member 30 to move in a direction to release the latching member 20 (causing the latching member 20 to move out of the positioning slot 3101).

In one embodiment, the limiting member 40 is mounted to an inner side of the cover body 200 by a mounting member 50. The locking member 10, the movable end 210 of the latching member 20, and the positioning member 30 are arranged on an outer side of the cover body 200.

In one embodiment, the limiting member 40 is resiliently coupled to the inner side of the cover body 200. The mounting structure 100 further includes resilient member 60. The limiting member 40 defines receiving holes 410. Each receiving hole 410 is configured to receive a corresponding one of the resilient members 60. The limiting member 40 further includes a latching portion 420.

Each resilient member 60 is partially received within a corresponding one of the receiving holes 410. The resilient members 60 are compressed within the receiving holes 410 by the cover body 200. The latching portion 420 latches with the external component. The external component latched with the latching portion 420 is mounted to the limiting member 40 by a preload force of the resilient members 60.

In the mounting structure 100 as described above, the latching member 20 is selectively received in either the positioning slot 3101 or the releasing slot 3102. The latching member 20 is movably coupled to the positioning member 30. When the latching member 20 is moved to be received within the positioning slot 3101, the latching member 20 is locked by the positioning member 30 and latched with the external component. When the latching member 20 is moved to be received within the releasing slot 3102, the latching member 20 is released and is able to be moved to be released from the external component. Thus, the cover plate 500 does not require extra tools for assembly or disassembly.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A mounting structure for removably mounting a cover body to an external component of the cover body, the mounting structure comprising:
   a limiting member coupled to the cover body;
   a latching member, one end of the latching member coupled to the limiting member, and another end of the latching member configured to latch with the external component; and
   a positioning member defining a positioning slot and a releasing slot, the positioning slot continuous with the releasing slot; wherein:
   the latching member is selectively received in either the positioning slot or the releasing slot;
   the latching member is movably coupled to the positioning member;
   when the latching member is moved to be received within the positioning slot, the latching member is locked by the positioning member and latched with the external component; and
   when the latching member is moved to be received within the releasing slot, the latching member is released by the positioning member and released from latching with the external component.

2. The mounting structure of claim 1, further comprising a locking member configured to be moved between a locking position and a releasing position with the latching member; wherein:
   when the locking member is moved to the locking position, the latching member is locked within the positioning slot; and
   when the locking member is moved to the releasing position, the latching member is able to be moved to be received within the releasing slot.

3. The mounting structure of claim 2, wherein the latching member comprises:
   an arm portion;
   a movable end coupled to an end of the arm portion; and
   a hook coupled to another end of the arm portion; wherein:
   the latching member is movably coupled to the positioning member by the movable end.

4. The mounting structure of claim 3, wherein:
   the locking member defines a latching slot;
   the movable end of the latching member forms a projection;
   when the locking member is moved to the locking position, the projection abuts an inner wall of the latching slot, and the latching member is locked within the positioning slot;
   when the locking member is moved to the releasing position, the projection does not abut the inner wall of the latching slot, and the latching member is able to be moved to be received within the releasing slot.

5. The mounting structure of claim 4, wherein:
   the positioning member further comprises a pushing portion forming a first inclined surface;
   the limiting member forms a second inclined surface; and
   when the positioning member is pressed toward the limiting member, the second inclined surface abuts the first inclined surface and causes the positioning member to move in a direction to release the latching member.

6. The mounting structure of claim 5, wherein:
   the positioning member comprises a positioning portion;
   the positioning slot and the releasing slot are defined by the positioning portion.

7. The mounting structure of claim 6, wherein:
the releasing slot is rectangular; and
the positioning slot and the releasing slot are in continuation with each other along a direction perpendicular to a length of the releasing slot.

8. A cover plate comprising a cover body and a mounting structure, the mounting structure configured to removably mount the cover body to an external component of the cover body, the mounting structure comprising:
a limiting member coupled to the cover body;
a latching member, one end of the latching member coupled to the limiting member, and another end of the latching member configured to latch with the external component; and
a positioning member defining a positioning slot and a releasing slot, the positioning slot continuous with the releasing slot; wherein:
the latching member is selectively received in either the positioning slot or the releasing slot;
the latching member is movably coupled to the positioning member;
when the latching member is moved to be received within the positioning slot, the latching member is locked by the positioning member and latched with the external component; and
when the latching member is moved to be received within the releasing slot, the latching member is released by the positioning member and released from latching with the external component.

9. The cover plate of claim 8, wherein:
the mounting structure further comprises a locking member configured to be moved between a locking position and a releasing position with the latching member;
when the locking member is moved to the locking position, the latching member is locked within the positioning slot; and
when the locking member is moved to the releasing position, the latching member is able to be moved to be received within the releasing slot.

10. The cover plate of claim 9, wherein:
the latching member comprises an arm portion, a movable end, and a hook;
the movable end is coupled to one end of the arm portion;
the hook is coupled to another end of the arm portion; and
the latching member is movably coupled to the positioning member by the movable end.

11. The cover plate of claim 10, wherein:
the locking member defines a latching slot;
the movable end of the latching member forms a projection;
when the locking member is moved to the locking position, the projection abuts an inner wall of the latching slot, and the latching member is locked within the positioning slot;
when the locking member is moved to the releasing position, the projection does not abut the inner wall of the latching slot, and the latching member is able to be moved to be received within the releasing slot.

12. The cover plate of claim 11, wherein:
the positioning member further comprises a pushing portion forming a first inclined surface;
the limiting member forms a second inclined surface; and
when the positioning member is pressed toward the limiting member, the second inclined surface abuts the first inclined surface and causes the positioning member to move in a direction to release the latching member.

13. The cover plate of claim 12, wherein:
the positioning member comprises a positioning portion;
the positioning slot and the releasing slot are defined by the positioning portion.

14. The cover plate of claim 13, wherein:
the releasing slot is rectangular; and
the positioning slot and the releasing slot are in continuation with each other along a direction perpendicular to a length of the releasing slot.

* * * * *